United States Patent

Miller et al.

(10) Patent No.: US 10,126,139 B2
(45) Date of Patent: Nov. 13, 2018

(54) ROUTE SELECTION METHOD AND SYSTEM FOR A VEHICLE HAVING A REGENERATIVE SHOCK ABSORBER

(71) Applicant: Ford Global Technologies, LLC, Dearborn, MI (US)

(72) Inventors: Kenneth James Miller, Canton, MI (US); Aed M. Dudar, Canton, MI (US); Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 102 days.

(21) Appl. No.: 15/404,753

(22) Filed: Jan. 12, 2017

(65) Prior Publication Data

US 2018/0195870 A1    Jul. 12, 2018

(51) Int. Cl.
G01C 21/34    (2006.01)
G07C 5/00    (2006.01)
H04L 29/08    (2006.01)

(52) U.S. Cl.
CPC ......... *G01C 21/3469* (2013.01); *G07C 5/008* (2013.01); *H04L 67/12* (2013.01)

(58) Field of Classification Search
CPC ............ G01C 21/3469; G01C 21/3682; G01C 21/00; G01C 21/26; G07C 5/008; B60G 13/14; H04L 67/12; G05D 1/027; G60G 17/016

See application file for complete search history.

(56) References Cited

U.S. PATENT DOCUMENTS

| | | | |
|---|---|---|---|
| 7,292,934 B2* | 11/2007 | Wolf | G01C 21/26 701/117 |
| 8,290,701 B2 | 10/2012 | Mason et al. | |
| 8,554,473 B2 | 10/2013 | Arcot et al. | |
| 9,868,332 B2* | 1/2018 | Anderson | B60G 17/016 |

(Continued)

FOREIGN PATENT DOCUMENTS

| | | |
|---|---|---|
| JP | 2012150004 | 8/2012 |
| WO | 2016044747 | 3/2016 |

OTHER PUBLICATIONS

Shankar et al., Method for estimating the energy consumption of electric vehicles and plug-in hybrid electric vehicles under real-world driving conditions, 2013, IEEE, p. 138-150 (Year: 2013).*

(Continued)

*Primary Examiner* — Mcdieunel Marc
(74) *Attorney, Agent, or Firm* — Carlson, Gaskey & Olds, P.C.

(57) ABSTRACT

A method includes directing a vehicle to take a route designated as a preferred route from among a plurality of potential routes. The designation as a preferred route is based in part on a predicted energy recovery from a regenerative shock absorber when the vehicle traverses the preferred route. A system includes a processor that executes a program designating at least one preferred route from among a plurality of potential routes. The designating is based in part on a predicted energy recovery from a regenerative shock absorber, and a transmitter that communicates the at least one preferred route to a vehicle.

20 Claims, 3 Drawing Sheets

(56) References Cited

U.S. PATENT DOCUMENTS

| | | | |
|---|---|---|---|
| 2006/0095171 A1* | 5/2006 | Whittaker | G05D 1/027 701/25 |
| 2008/0167771 A1* | 7/2008 | Whittaker | G05D 1/027 701/26 |
| 2014/0136089 A1 | 5/2014 | Hranac et al. | |
| 2014/0244110 A1* | 8/2014 | Tharaldson | G07C 5/008 701/36 |
| 2015/0224845 A1* | 8/2015 | Anderson | B60G 17/019 701/37 |
| 2015/0276420 A1 | 10/2015 | McGee et al. | |
| 2015/0298684 A1 | 10/2015 | Schwartz et al. | |
| 2016/0003621 A1* | 1/2016 | Koenig | G01C 21/00 701/31.4 |
| 2016/0025508 A1 | 1/2016 | Meyer et al. | |
| 2017/0136897 A1* | 5/2017 | Ricci | B60L 11/182 |
| 2017/0205246 A1* | 7/2017 | Koenig | G01C 21/3682 |

OTHER PUBLICATIONS

Cela et al., Energy optimal real-time navigation system: Application to a hybrid electrical vehicle, 2014, IEEE, p. 1947-1952 (Year: 2014).*

Xue et al., Traffic-Known Urban Vehicular Route Prediction Based on Partial Mobility Patterns, 2009, IEEE, p. 369-375 (Year: 2009).*

Lin et al., Hydraulic Transmission Electromagnetic Energy-Regenerative Active Suspension and Its Working Principle, 2010, IEEE, p. 1-4 (Year: 2010).*

Nisenhaus, Muenter, Hussein, and Ziegler, Playful Crowdsourcing for Energy-Efficient Automotive Navigation, Proceedings of DiGRA 2011 Conference: Think Design Play.

Zhang, Zhang, Chen, et al. A high-efficiency energy regenerative shock absorber using supercapacitors for renewable energy application in range extended electric vehicle, article in Applied Energy, Sep. 2016, pp. 177-188.

* cited by examiner

ROUTE SELECTION METHOD AND SYSTEM FOR A VEHICLE HAVING A REGENERATIVE SHOCK ABSORBER

TECHNICAL FIELD

This disclosure relates generally to directing a vehicle along a route to a destination. The route is selected based, in part, on a predicted energy recovery from a regenerative shock absorber when the vehicle traverses the route.

BACKGROUND

Electrified vehicles differ from conventional motor vehicles because, among other things, electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Electrified vehicle and conventional vehicles can incorporate regenerative shock absorbers. Energy recovered from the regenerative shock absorbers can be used to, for example, charge the traction battery in electrified vehicles. In conventional vehicles and electrified vehicles, energy recovered from the regenerative shock absorbers can be used to power vehicle systems, like a Heating, Ventilation and Air Conditioning (HVAC) system.

An electrified vehicle can traverse a route to a destination, as can a conventional vehicle. Often, there are multiple routes to the destination. A net energy consumption for the electrified or conventional vehicle can vary depending on the route traversed to the destination.

SUMMARY

A route selection method according to an exemplary aspect of the present disclosure includes, among other things, directing a vehicle to take a route designated as a preferred route from among a plurality of potential routes. The designation as a preferred route is based in part on a predicted energy recovery from a regenerative shock absorber when the vehicle traverses the preferred route.

In a further non-limiting embodiment of the foregoing method, the predicted energy recovery from the regenerative shock absorber is based on a measured energy recovery from a regenerative shock absorber in a crowd vehicle that previously traversed the preferred route.

In a further non-limiting embodiment of any of the foregoing methods, the predicted energy recovery is adjusted based on a speed at which the crowd vehicle previously traversed the preferred route In a further non-limiting embodiment of any of the foregoing methods, the predicted energy recovery is adjusted based in part on degradation of the regenerative shock absorber in the vehicle, degradation of the regenerative shock absorber in the crowd vehicle that previously traversed the preferred route, or both.

In a further non-limiting embodiment of any of the foregoing methods, a predicted net energy consumption for the vehicle is associated with each of the plurality of potential routes. The predicted net energy consumption for the preferred route is less than the predicted net energy consumption for each of the other routes in the plurality of potential routes.

A further non-limiting embodiment of any of the foregoing methods includes estimating the predicted energy recovery from the regenerative shock absorber for each of the plurality of potential routes.

In a further non-limiting embodiment of any of the foregoing methods, the predicted energy recovery from the regenerative shock absorber when the vehicle traverses the preferred route is estimated by adding a measured energy recovery from a regenerative shock absorber when traversing a first route segment of the preferred route to a measured energy recovery from a regenerative shock absorber when traversing a second route segment of the preferred route.

In a further non-limiting embodiment of any of the foregoing methods, the first route segment and the second route segment each extend between street intersections along the preferred route.

In a further non-limiting embodiment of any of the foregoing methods, the predicted energy recovery is based on measured energy recoveries for previous traversals of the preferred route.

In a further non-limiting embodiment of any of the foregoing methods, the plurality of measured energy recoveries are provided by other vehicles.

In a further non-limiting embodiment of any of the foregoing methods, the method includes storing the measured energy recoveries in a cloud server.

In a further non-limiting embodiment of any of the foregoing methods, the predicted energy recovery is an average of the measured energy recoveries.

In a further non-limiting embodiment of any of the foregoing methods, the predicted energy recovery is based on a plurality of measurements collected by shock absorber sensors during previous drives along the preferred route.

In a further non-limiting embodiment of any of the foregoing methods, the predicted energy recovery is communicated to the vehicle from a cloud server.

In a further non-limiting embodiment of any of the foregoing methods, the preferred route includes a plurality of preferred routes, and the method includes displaying the plurality of preferred routes as optional routes for selection by an operator of the vehicle.

A further non-limiting embodiment of any of the foregoing methods includes additionally basing the designating on an operator preference for a smoother route with less energy recovery from the regenerative shock absorber or a bumpier route with more energy recovery from the regenerative shock absorber.

A route selection system according to another exemplary aspect of the present disclosure includes, among other things, a processor that executes a program designating a preferred route from among a plurality of potential routes. The designating is based in part on a predicted energy recovery from a regenerative shock absorber. A transmitter communicates the preferred route to a vehicle.

A further non-limiting embodiment of the foregoing system includes a crowd sourced data storage module that stores information corresponding to measured energy recoveries from regenerative shock absorbers of at least one crowd vehicle that traversed at least some of the plurality of potential routes.

In a further non-limiting embodiment of the foregoing system, the predicted energy recovery is based on the information stored in the crowd sourced data module.

In a further non-limiting embodiment of the foregoing system, the information corresponding to measured energy recoveries from regenerative shock absorbers is provided by accelerometers of the at least one crowd vehicle.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure involves directing a vehicle to take a route to a destination. The route is one of a plurality of potential routes to the destination. The route is designated as a preferred route.

The vehicle has at least one regenerative shock absorber. Designation of a particular route to the destination as a preferred route is based, in part, on a predicted energy recovery from the at least one regenerative shock absorber when the vehicle traverses the particular route to the destination.

In some examples, the preferred route is designated is based on a predicted net energy consumption. The predicted energy recovery from the regenerative shock absorber is one variable within the predicted net energy consumption. These and other features are discussed in greater detail in the following paragraphs of the Detailed Description.

Figure 1:
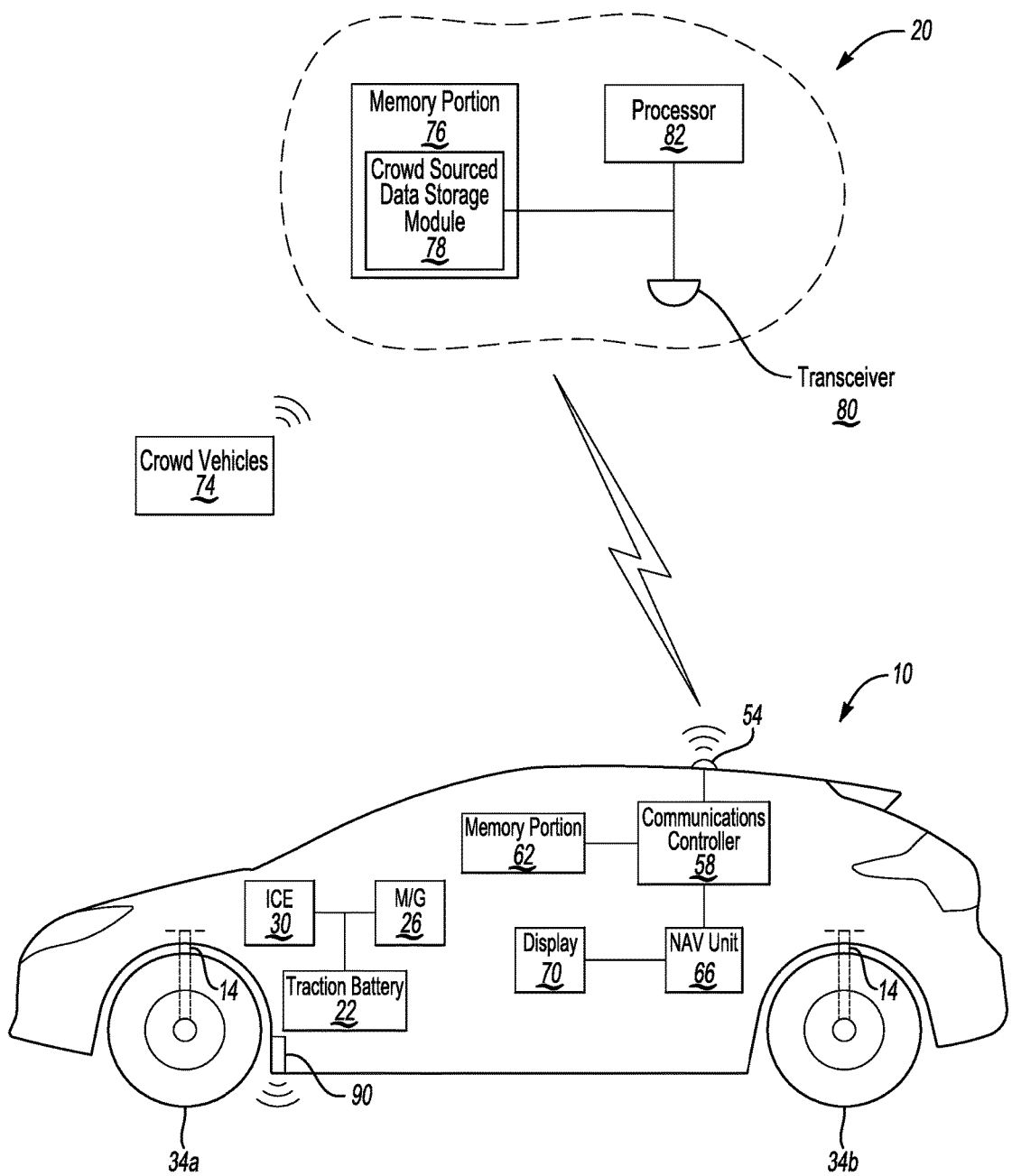
FIG. 1 illustrates a schematic view of a route selection system used in connection with a vehicle having regenerative shock absorbers.

Referring to FIG. 1, a vehicle 10 having a plurality of regenerative shock absorbers 14 is in communication with a computing arrangement 20 outside the vehicle 10. In this exemplary, non-limiting embodiment, the vehicle 10 is an electrified vehicle.

In particular, the vehicle 10 is a hybrid electric vehicle (HEV). It should be understood, however, that the concepts described herein are not limited to HEVs and could extend to other types of vehicles incorporating regenerative shock absorbers. These other vehicles could include, but are not limited to, conventional vehicles, or other electrified vehicles, such as plug-in hybrid vehicles (PHEVs), battery electric vehicles (BEVs), etc. The other vehicles could additionally include driverless autonomous vehicles.

In addition to the regenerative shock absorbers 14, the exemplary vehicle 10 includes a traction battery 22, an electric machine 26, an internal combustion engine 30, a set of front wheels 34a, and a set of rear wheels 34b. The vehicle 10 can power the wheels 34a utilizing torque generated by the electric machine 26, the internal combustion engine 30, or both. The example traction battery 22 is a relatively high-voltage battery and part of a relatively high-voltage system of the vehicle 10. In other non-limiting embodiments, the traction battery 22 could instead be part of a low-voltage system of the vehicle, such as a 12 volt or 48 volt system.

The regenerative shock absorbers 14 are part of a suspension system for the vehicle 10. As the vehicle 10 moves, the regenerative shock absorbers 14 damp and absorb shock impulses. The regenerative shock absorbers 14 convert the kinetic energy of the shock into energy that can be stored and used by the vehicle 10. In this example, the regenerative shock absorbers 14 convert the kinetic energy of the shock into energy that is used to recharge the traction battery 22. Non-regenerative shock absorbers, in contrast to the regenerative shock absorbers 14, dissipate kinetic energy of a shock as heat rather than converting the kinetic energy of the shock into energy used by a vehicle.

In examples where the regenerative shock absorbers 14 are incorporated into a conventional vehicle rather than an electrified vehicle, energy from the regenerative shock absorbers 14 could be used to power accessories of the conventional vehicle rather than recharging the traction battery 22. Exemplary accessories could include, for example, a heating ventilation and air conditioning (HVAC) system of the conventional vehicle.

Figure 2:
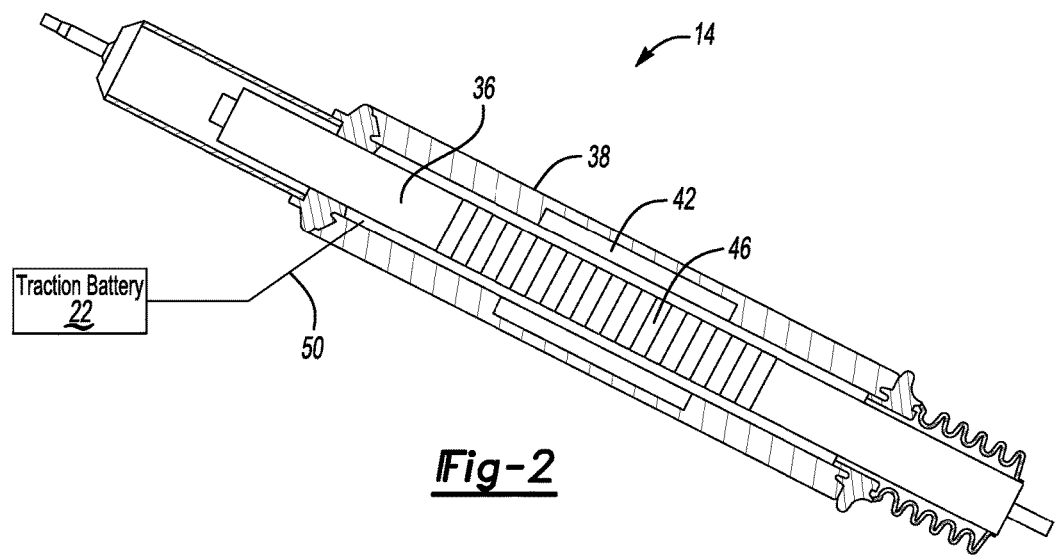
FIG. 2 illustrates a regenerative shock absorber from the vehicle of FIG. 1.

Referring to FIG. 2 with continuing reference to FIG. 1, each of the regenerative shock absorbers 14 includes an inner cylinder 36, an outer cylinder 38, stator windings 42, a permanent magnet stack 46, and an electrical connection 50 to, for example, the traction battery 22. The permanent magnet stack 46 is secured to the inner cylinder 36. The stator windings 42 are secured to the outer cylinder 38.

As the vehicle 10 moves over, for example, bumps in a road, the regenerative shock absorbers 14 and other portions of the suspension system, such as a spring, permit the wheels 34a, 34b to move relative to the remaining portions of the vehicle 10. The regenerative shock absorbers 14 absorb some of the energy during the movement to reduce oscillations.

In particular, the inner cylinder 36 moves relative to the outer cylinder 38 to accommodate movement. Movement of the inner cylinder 36 relative to the outer cylinder 38 results in the permanent magnet stack 46 moving relative to the stator windings 42. In some examples, a controller of the vehicle 10 can adjust a magnetic field of the regenerative shock absorbers 14 to increase or decrease the forces resisting movement of the inner cylinder 36 relative to the outer cylinder 38. This relative movement plus this increased/decreased strength of the magnetic field generates a quantity of electrical energy. The electrical energy is passed through the electrical connection 50 to, in this exemplary embodiment, the traction battery 22. The energy recovered from the regenerative shock absorber 14 is considered regenerative energy.

As can be appreciated, directing the vehicle 10 along a bumpy route with rough terrain causes more movement of the inner cylinder 36 relative to the outer cylinder 38 than a smooth route. Thus, more regenerative energy is generated from the regenerative shock absorbers 14 when the vehicle 10 is directed along a route with relatively rough terrain than when the vehicle 10 is directed along a route with relatively smooth terrain.

In this exemplary embodiment, the vehicle 10 is directed along a preferred route to a destination based, in part, on a predicted energy recovery from the regenerative shock absorbers 14 that will be generated when traversing the preferred route. In this example, the computing arrangement 20 communicates one or more preferred routes to the vehicle 10. An operator of the vehicle 10 then directs the vehicle 10 along one of the preferred routs.

Presenting the preferred routes to an operator of the vehicle 10 involves communications between the computing arrangement 20 and the vehicle 10. The vehicle 10 includes a transceiver 54, a communications controller 58, a memory portion 62, a navigation unit 66, and a display 70.

The transceiver 54 is configured to receive wireless communications from the computing arrangement 20 and further configured to send wireless communications to the computing arrangement 20. Although shown as the transceiver 54, the vehicle 10 could instead, or additionally, include at least one receiver and at least one separate transmitter.

The communications controller 58 controls communications to and from the vehicle 10. The memory portion 62 stores information relevant to communications to and from the vehicle 10. In an exemplary non-limiting embodiment, the memory portion 62 can store measured energy recoveries from the regenerative shock absorbers 14 when the vehicle 10 is traveling. These measured energy recoveries can be communicated to the computing arrangement 20 to facilitate designation of a preferred route. The communications controller 58 can be part of, for example, a vehicle or engine control module of the vehicle 10.

The navigation unit 66 can communicate with a satellite navigation unit to locate the vehicle 10 within a geographical area. The navigation unit 66 can provide maps to an operator of the vehicle 10 through the display 70. An operator may input a desired destination for the vehicle 10 through the display 70, the navigation unit 66, or both. The display 70 could be part of a human machine interface permitting such an input.

The navigation unit 66 can be programmed to provide a multiple of potential routes to a destination that are revealed to the operator through the display 70. In this example, the computing arrangement 20 refines the potential routes viewable on the display 70.

The computing arrangement 20 is at least partially cloud based. The computing arrangement 20 includes a memory portion 76 with a crowd sourced data storage module 78, a transceiver 80, and a processor 82. Through the transceiver 80, the computing arrangement 20 can communicate with the vehicle 10 and a plurality of crowd vehicles 74. Although shown as the transceiver 80, the computing arrangement 20 could instead, or additionally, include at least one receiver and at least one separate transmitter.

Generally, the crowd vehicles 74 include vehicles that can wirelessly communicate with the computing arrangement 20 through the transceiver 80. The crowd vehicles 74 could include thousands of separate vehicles. In some examples, the vehicle 10 is one of the crowd vehicles 74.

The example processor 82 can be operatively linked to the memory portion 76. The processor 82 can be programmed to execute a program stored in the memory portion 76. The program may be software code may include one or more additional or separate programs, each of which includes an ordered listing of executable instructions for implementing logical functions.

The processor 82 can be a custom made or commercially available processor, a central processing unit (CPU), an auxiliary processor among several processors, a semiconductor-based microprocessor (in the form of a microchip or chip set) or generally any device for executing software instructions.

The memory portion 76 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). The memory portion 76 may incorporate electronic, magnetic, optical, and/or other types of storage media. The memory portion 76 can also have a distributed architecture, where various components are situated remotely from one another, but can be accessed by the processor 82.

The crowd sourced data storage module 78 is part of the memory portion 76 in this example. The crowd sourced data storage module 78 represents a segment of the memory portion 76 storing information from the crowd vehicles 74.

The processor 82 is configured to execute a program using the information stored in the crowd sourced data storage module 78 to generate at least one preferred route to a destination. The transceiver 80 communicates the at least one preferred route to the vehicle 10.

Figure 3:
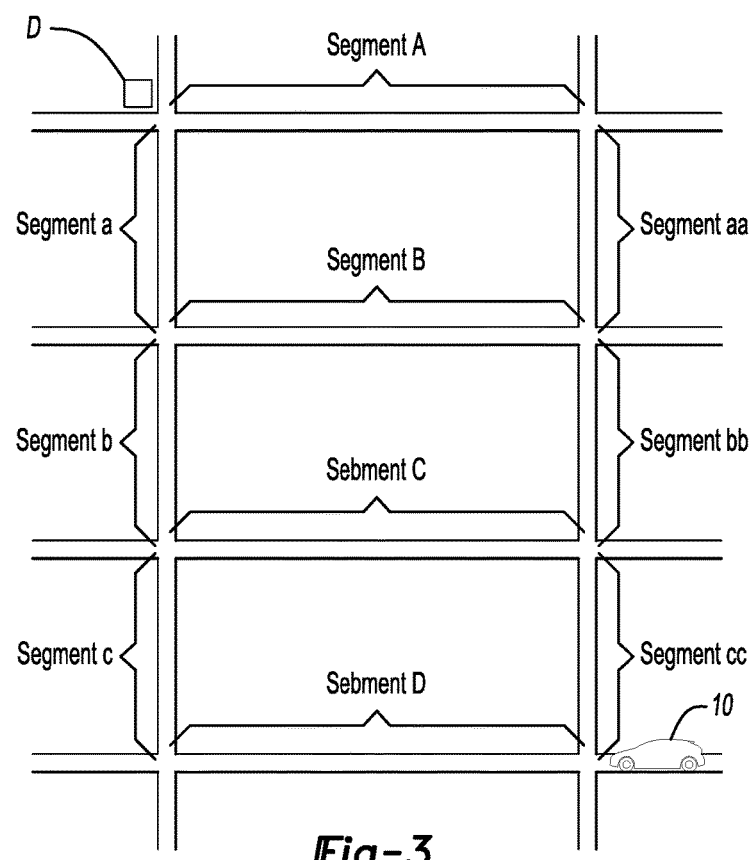
FIG. 3 illustrates a schematic view of the vehicle, a destination for the vehicle, and a plurality of potential routes for the vehicle to travel to the destination.

Referring to FIG. 3 with continuing reference to FIG. 1, the vehicle 10 is shown with an exemplary destination D. An operator of the vehicle 10 can input the destination D through the display 70 or navigation unit 66, for example. There are a plurality of potential routes for the vehicle 10 to move to the destination D. The potential routes are divided into route segments a, b, c, aa, bb, cc, A, B, C, and D.

A first potential route to the destination D can require the vehicle 10 to be directed first along route segment cc, then route segment C, then route segment b, and then route segment a. A second potential route to the destination D can require the vehicle 10 to be directed first along route segment cc, then route segment bb, then route segment aa, then route segment A. A third potential route to the destination D can require the vehicle 10 to be directed first along route segment D, then route segment c, then route segment b, the then route segment a.

As can be appreciated, the route segments can be included in more than one potential route. In this example, the route segment b forms part of the first potential route and part of the third potential route.

The route segments can be defined in many ways. In this example, the route segments generally correspond to a section of a route extending from a first street intersection to a second street intersection directly adjacent the first street intersection.

Energy recovery from regenerative shock absorbers of a vehicle when the vehicle is directed along a route segment can be measured and considered a segment shock total. The crowd sourced data storage module 78 stores segment shock totals for the crowd vehicles 74 for each of the route segments. The segment shock totals are measured total energy recoveries from at least one regenerative shock absorber during a previous traversal of the crowd vehicles 74 along the each of the route segments.

For example, after one of the crowd vehicles 74 is directed along the particular route segment, say route segment b, the segment shock total from that vehicle for the route segment b is recorded and uploaded to the crowd source data storage module 78. This process continues as other crowd vehicles 74 are directed along the route segment b. Eventually, the crowd source data storage module 78 is populated with segment shock totals from several crowd vehicles 74 for the route segment b.

Over time, the crowd source data storage module 78 is populated with segment shock totals from the crowd vehicles 74 for the route segments within a given area, such as the area shown in FIG. 3. The entire route from the vehicle 10 to the destination could include only one route segment, or could be a combination of several route segments.

Notably, providing the segment shock totals to the crowd sourced data storage module 78 after the crowd vehicle traversed a route segment reduces an amount of information communicated to the crowd sourced data storage module 78, which may be desirable.

In some examples, the segment shock totals can be categorized within the crowd sourced data storage module 78 based on a speed at which the crowd vehicles 74 traversed the route segment. One of the crowd vehicles 74 that moved at a first, slower speed through route segment may, for example, have a segment shock total that is reduced relative to another of the crowd vehicles 74 that moved through the same route segment at a second, faster speed.

The crowd vehicles 74 may delay transmission of the segment shock totals to the crowd sourced data storage module 78 for a period of time. The crowd vehicles 74 could store their segment shock totals with a memory portion of the crowd vehicle, such as the memory portion 62 of the vehicle 10. Then, when the crowd vehicle is provided with an opportunity to communicate with the computing arrangement 20, the segment shock totals for the route segments traversed by the crowd vehicles 74 are transmitted to the crowd sourced data storage module 78.

For example, each of the crowd vehicles 74 may delay transmission of their segment shock totals until parked at the end of a drive cycle. Delaying the transmission may prevent interference with the transmission and can ensure that the crowd vehicles 74 are effectively able to communicate with the crowd sourced data storage module 78.

Figure 4:
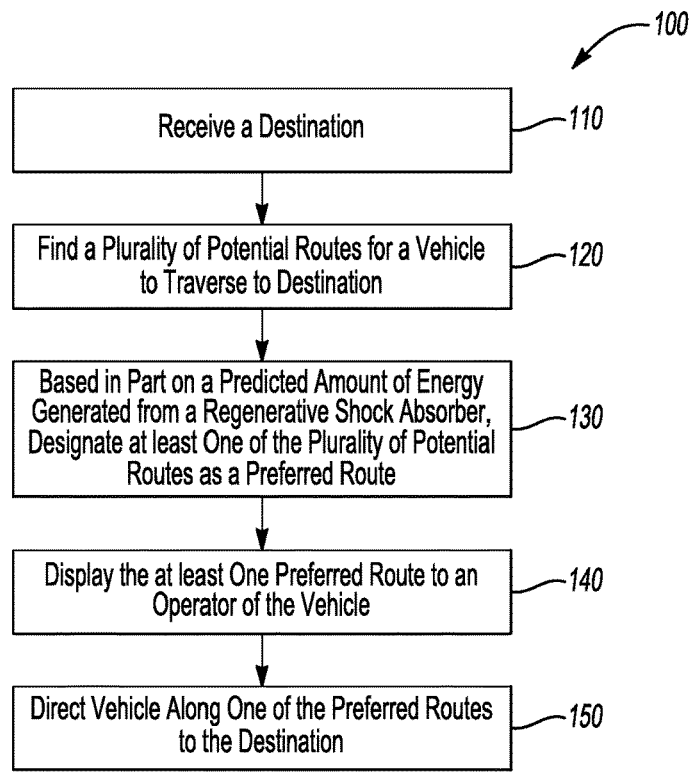
FIG. 4. Illustrates a flow of an exemplary route selection method associated with the vehicle of FIG. 1.

Referring now to FIG. 4 with continued reference to FIGS. 1 and 3, an exemplary method 100 is utilized by the processor 82 within the computing arrangement 20. The method 100 provides the vehicle 10 with at least one preferred route that is based, at least in part, on the segment shock totals from the crowd vehicles 74.

Within the method 100, the processor 82 executes a program that receives a destination from the vehicle 10, such as the destination D, at a step 110. The destination can be input by an operator of the vehicle 10 through the display 70 or the navigation unit 66, and then communicated via the communications controller 58 to the computing arrangement 20.

At a step 120, the computing arrangement 20 finds a plurality of potential routes that the vehicle 10 could traverse to reach the destination. The potential routes are different paths that the vehicle 10 can take to move the vehicle 10 to the destination.

Next, at a step 130, the processor 82 designates at least one of the plurality of potential routes found in the step 120 as a preferred route. The processor 82 can subtract an estimate of segment shock energy generation from an estimation of the segment non-shock-absorber energy usage required to operate the vehicle 10, to determine the total energy usage estimate for the various routes, and then store the total energy usage estimate for the various routes in the crowd sourced data storage module 78. From the stored total energy usage estimates, the processor 82 can designating one of the plurality of potential routes as a preferred route. The preferred route can be, for example, the route with the lowest total energy usage estimate.

The processor 82 can designate routes with the highest average segment shock totals as the preferred routes, for example. The vehicle 10 may generate more energy from the regenerative shock absorbers 14 when directed along routes having the highest average segment shock totals.

After designating the preferred routes, the computing arrangement 20 communicates these preferred routes to the vehicle 10 through the communications controller 58. The routes designated as preferred routes could be revealed to an operator of the vehicle 10 using the display 70 at a step 140.

At a step 150, the vehicle 10 is directed along one of the designated preferred routes to the destination D.

Figure 5:
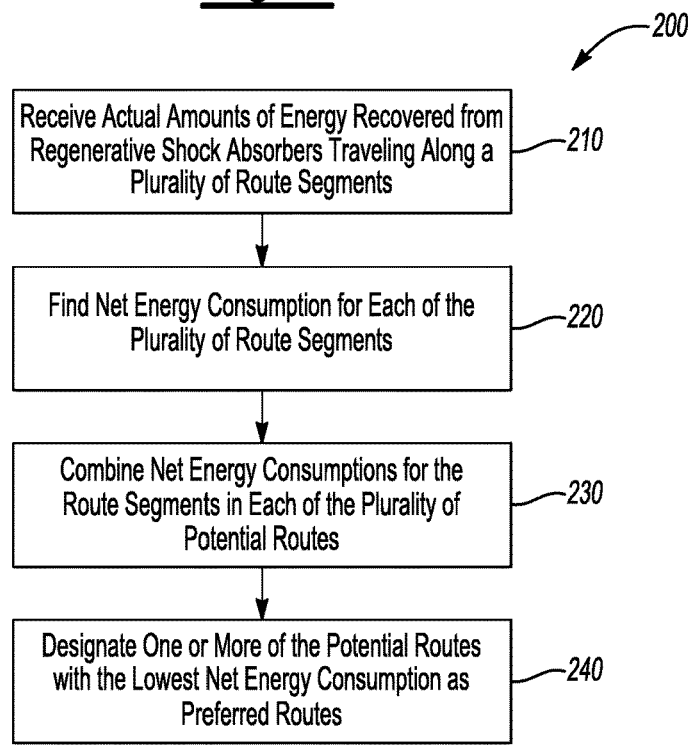
FIG. 5 illustrates a flow of an exemplary step in the method of FIG. 4.

Referring now to FIG. 5 with continuing reference to FIGS. 1, 3, and 4, the step 130 in the method 100 can include a sub-method 200 utilized by the processor 82 when designating one or more of the potential routes as the preferred route.

In the sub-method 200, the processor 82 receives, at a step 210, segment shock totals from the crowd vehicles 74. The segment shock totals are provided to the processor 82 by the crowd sourced data storage module 78. The segment shock totals represent actual amounts of energy recovered from regenerative shock absorbers 14.

The sub-method 200 next, at a step 220 uses information provided by the crowd vehicles 74 to find the net energy consumption for each of the plurality of route segments within the plurality of potential routes. In such an example, each of the crowd vehicles 74 populates the crowd sourced data storage module 78 with segment shock totals for each segment that the vehicle has traversed. Where possible, the crowd vehicles 74 additionally populates the crowd sourced data storage module 78 with additional data types for each of the route segments. The additional data types could include, for each route segment that the crowd vehicles 74 have traversed, a total propulsive energy used, a total HVAC energy used, a total regenerative energy acquired from braking, and a total of energy used by other devices. The processor 82 can then calculate an average of each of the data types for each of the route segments within the potential routes.

The processor 82 then executes a program that estimates a net energy consumption ($NET_{EST}$) for each route segment. The estimate can be made, in one non-limiting embodiment, using Equation 1 below:

$$NET_{EST} = (T_{PROP} + T_{HVAC}) - R_{REGEN.\ BRAKE} - R_{REGEN\ SHOCK} - T_{USED} \qquad \text{Equation 1:}$$

In Equation 1, $T_{PROP}$ is the average total propulsive energy used by the crowd vehicles when traversing a given route segment and $T_{HVAC}$ is the average total HVAC energy used by the crowd vehicles when traversing the given route segment. $R_{REGEN\ BRAKE}$ is an average total regenerative energy acquired by the crowd vehicles from regenerative braking when traversing the given route segment. $R_{REGEN\ SHOCK}$ is an average total regenerative energy acquired by the crowd vehicles from regenerative shock absorbers when traversing the given route segment. $T_{USED}$ is an average total of other energy used by the crowd vehicles when traversing the given route segment.

Next, at a step 230, the sub-method 200 combines net energy consumptions for the route segments within each of the plurality of potential routes.

Then, at a step 240, one or more of the potential routes with the lowest net energy consumptions is designated as a preferred route. The sub-method 200 could, for example, designate three potential routes as preferred routes. Those three preferred routes are then communicated to the vehicle 10 in the step 140 of the method 100. After viewing the preferred routes, the operator of the vehicle 10 selects the desired preferred route, and then directs the vehicle 10 along the desired preferred route.

Although the exemplary embodiment communicates measured energy recoveries from regenerative shock absorbers to the computing arrangement 20, other embodiments may communicate other types of information that the processor 82 of the computing arrangement 20 utilizes to designate preferred routes. For example, the crowd vehicles could include a movement sensor, such as a sensor 90 in the vehicle 10. The movement sensor measures relative movements and shocks of the crowd vehicles 74 when traversing various route segments. The movement sensor could be a shock absorber movement sensor that measures movement of the shock absorbers of the vehicle even if the shock absorbers are not regenerative shock absorbers.

In some exemplary embodiments, the sensor 90 is an accelerometer on the vehicle 10. The accelerometer can be mounted on the regenerative shock absorber 14 or another portion of the vehicle 10. Based on readings from the accelerometer, the processor 82 can estimate regenerative shock movement or energy.

These measured movements of the vehicle are then communicated to the computing arrangement 20. Predicted energy recovery from the regenerative shock absorbers 14 can be extrapolated from the measurements provided by the sensor 90. For example, if the sensor 90 detects frequent and substantial movements of the crowd vehicles when traversing a particular route segment, that route segment would be have particularly high predicted energy recovery from the regenerative shock absorbers 14 due to the frequent and substantial movements.

Generally, the amount of motion detected by the movement sensor over a given route segment is proportional to an amount of regenerative energy that will be recovered by a regenerative shock absorber if the regenerative shock absorber traversed the given route segment.

Using the sensors 90 can provide the crowd sourced data storage module 78 with information relevant to regenerative shock absorbers even if the crowd vehicles 74 do not include regenerative shock absorbers.

In some examples, the preferred routes may be refined further based on an operator input or preference. For example, the display 70 may provide the operator with the ability to prioritize a more efficient route over a smoother route, or to prioritize a smooth route over a more efficient route. The efficient route could result in the operator experiencing a bumpier ride within the vehicle 10, but would provide more recovery of regenerative energy from the regenerative shock absorbers. The smoother route could result in less energy recovery from the regenerative shock absorbers, but may provide the operator with a smoother ride.

The operator could input a preference for a smoother ride or a more efficient ride suing the display 70. The input could be in the form of a sliding scale where the operator weights the importance of a smooth journey relative to the importance of an energy efficient journey.

The processor 82 then provides a preferred route based on the preference. If the most efficient routes are desired by the operator, the preferred routes would be provided with less regard for smoothness. If smoother routes are desired, the processor 82 would designate the preferred route but place less emphasis on recovery of regenerative energy from the regenerative shock absorbers. The processor 82 can, in some examples, determines the preferred route by multiplying the resulting energy consumption for each route by a weighting factor. The input from the operator relating to the importance of a smooth journey verses the importance of an energy efficient journey can be used to develop the weighting factor, for example.

If the vehicle 10 is a driverless autonomous vehicle without passengers, the preferences may be set to prioritize the bumpier, but more efficient routes, rather than the smoother routes. In some examples, the vehicle 10 could be a driverless autonomous vehicle that stiffens its suspension to facilitate more energy recovery from the regenerative shock absorbers 14.

In another example, the predictions of energy recovery from the regenerative shock absorbers 14 are adjusted based on degradation of the regenerative shock absorbers 14 or the regenerative shock absorbers in the crowd vehicles 74.

More specifically, the efficiency of energy recovery from the regenerative shock absorbers 14 can be characterized as the energy recovered from the regenerative shock absorbers 14 when moved a given amount in in given time divided by the nominal energy recovery for the given amount in the given time. As the time in service for the regenerative shock absorbers 14 increases, the efficiency can degrade. The predicted energy recovery for a route segment can be adjusted based, in part, on degradation of the regenerative shock absorber 14 in the vehicle 10, degradation of the regenerative shock absorbers in the crowd vehicles 74, or some combination of these.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A route selection method, comprising:
directing a vehicle to take a route designated as a preferred route from among a plurality of potential routes, the designation as a preferred route based in part on a predicted energy recovery from at least one regenerative shock absorber when the vehicle traverses the preferred route, the predicted energy recovery based in part on a measured energy recovery from a regenerative shock absorber of at least one crowd vehicle that traversed at least some of the plurality of potential routes, the measured energy recovery stored within a crowd sourced data storage module.

2. The route selection method of claim 1, wherein the predicted energy recovery is adjusted based on a speed at which the at least one crowd vehicle previously traversed the preferred route.

3. The route selection method of claim 1, wherein the predicted energy recovery is adjusted based in part on degradation of the at least one regenerative shock absorber in the vehicle, degradation of the regenerative shock absorber in the at least one crowd vehicle that previously traversed the preferred route, or both.

4. The route selection method of claim 1, wherein a predicted net energy consumption for the vehicle is associated with each of the plurality of potential routes, the predicted net energy consumption for the preferred route less than the predicted net energy consumption for each of the other routes in the plurality of potential routes.

5. The route selection method of claim 1, further comprising estimating the predicted energy recovery from the at least one regenerative shock absorber for each of the plurality of potential routes.

6. The route selection method of claim 1, wherein the predicted energy recovery from the at least one regenerative shock absorber when the vehicle traverses the preferred route is estimated by adding the measured energy recovery from the regenerative shock absorber of the at least one crowd vehicle when traversing a first route segment of the preferred route to the measured energy recovery from the regenerative shock absorber of the at least one crowd vehicle when traversing a second route segment of the preferred route.

7. The route selection method of claim 6, wherein the first route segment and the second route segment each extend between street intersections along the preferred route.

8. The route selection method of claim 1, wherein the predicted energy recovery is based on a plurality of the measured energy recoveries for previous drives along the preferred route.

9. The route selection method of claim 8, wherein the predicted energy recovery is an average of more than one measured energy recovery.

10. The route selection method of claim 8, wherein the crowd sourced data storage module is cloud based.

11. The route selection method of claim 1, wherein the measured energy recovery is collected by at least one shock absorber sensors during previous traversals of the preferred route by the at least one crowd vehicle.

12. The route selection method of claim 1, wherein the predicted energy recovery is communicated to the vehicle from a cloud server.

13. The route selection method of claim 1, wherein the preferred route comprises a plurality of preferred routes, and further comprising displaying the plurality of preferred routes as optional routes for selection by an operator of the vehicle.

14. The route selection method of claim 1, further comprising additionally basing the designating on an operator preference for a smoother route with less energy recovery from the at least one regenerative shock absorber or a bumpier route with more energy recovery from the at least one regenerative shock absorber.

15. A route selection system, comprising:
    a processor that executes a program designating at least one preferred route from among a plurality of potential routes, the designating based in part on a predicted energy recovery from at least one regenerative shock absorber;
    a transmitter that communicates the at least one preferred route to a vehicle; and
    a crowd sourced data storage module that stores information corresponding to measured energy recoveries from regenerative shock absorbers of at least one crowd vehicle that traversed at least some of the plurality of potential routes.

16. The route selection system of claim 15, wherein the predicted energy recovery is based on the information stored in the crowd sourced data module.

17. The route selection system of claim 15, wherein the information corresponding to measured energy recoveries from regenerative shock absorbers is provided by accelerometers of the at least one crowd vehicle.

18. A route selection system, comprising:
    a crowd sourced data storage module that stores information corresponding to measured energy recoveries from regenerative shock absorbers of at least one crowd vehicle that traversed at least some of a plurality of potential routes; and
    a processor that executes a program designating at least one preferred route from among the plurality of potential routes based in part on the measured energy recoveries.

19. The route selection system of claim 18, wherein the crowd sourced data storage module is at least partially cloud based.

20. The route selection system of claim 19, further comprising a transmitter that communicates the at least one preferred route to a vehicle.

* * * * *

UNITED STATES PATENT AND TRADEMARK OFFICE
CERTIFICATE OF CORRECTION

| | | |
|---|---|---|
| PATENT NO. | : 10,126,139 B2 | Page 1 of 1 |
| APPLICATION NO. | : 15/404753 | |
| DATED | : November 13, 2018 | |
| INVENTOR(S) | : Miller et al. | |

It is certified that error appears in the above-identified patent and that said Letters Patent is hereby corrected as shown below:

In the Claims

In Claim 11, Column 11, Line 18; replace "sensors" with --sensor--

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*